July 9, 1935.  H. J. L. FRANK ET AL  2,007,893
COLLECTOR
Filed June 3, 1933
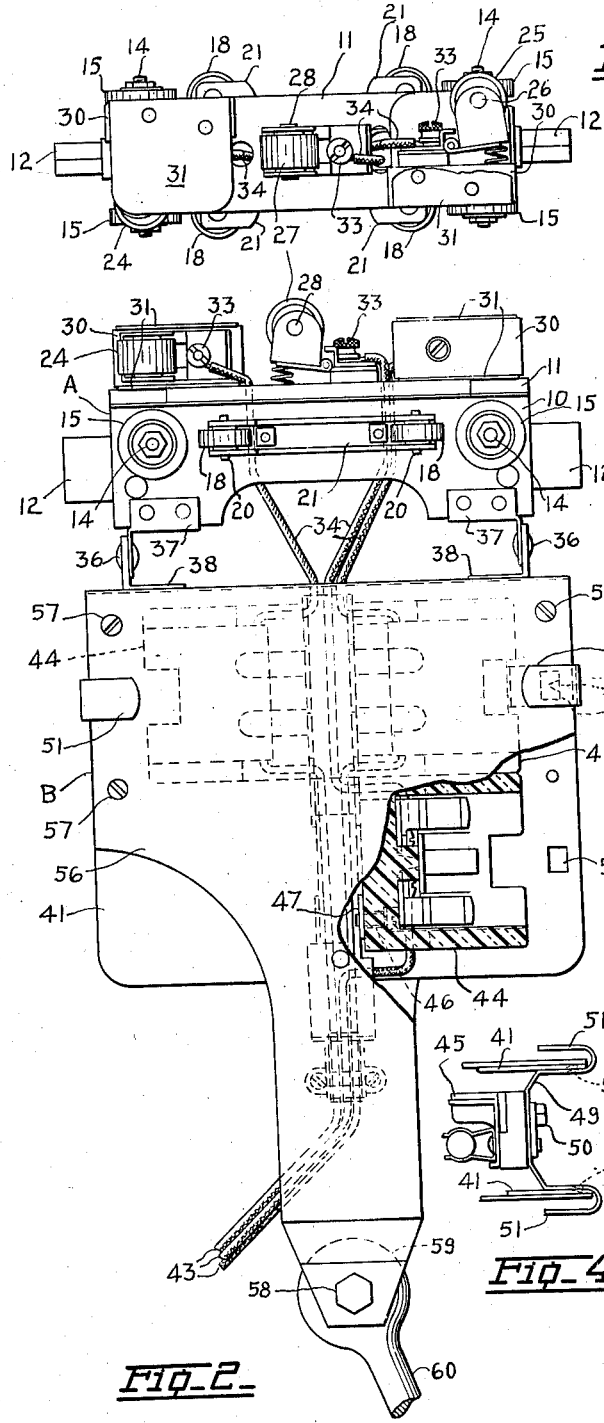
INVENTORS
Harrison J. L. Frank
William A. Harper
BY
Daniel G. Cullen
ATTORNEY.

Patented July 9, 1935

2,007,893

UNITED STATES PATENT OFFICE 2,007,893

COLLECTOR

Harrison J. L. Frank and William A. Harper, Detroit, Mich., assignors to Bulldog Electric Products Company, Detroit, Mich., a corporation of West Virginia Application June 3, 1933, Serial No. 674,182

15 Claims. (Cl. 105—155)

This invention relates to collectors, particularly adapted for use in connection with the stationary duct of a current distributing system, such as the one disclosed in our co-pending application, Serial No. 674,183, filed June 3, 1933.

The above identified application relates to the duct which includes the bus bars from which current is to be taken, while the instant application relates to the collectors for withdrawing current from the duct of that application.

As has been described in the Frank et al. patents, Nos. 1,819,885, and 1,819,886, of August 18, 1931, it has become common practice to provide a duct, as the stationary part of a current distribution system, from which duct the current may be taken at desired points by means of collectors or the like. The present invention relates to improved collectors, it being understood that the term collector, as used herein, is to refer to a device having a portion insertable into the duct for collecting current from the bus bars therein, and a portion outside of the duct which leads the current so collected to a consuming device, such as a machine, power tool, etc., often carried by the collector itself.

The principal object of the present invention is to provide a collector which shall be light weight and of small size, and which has a high degree of economy of manufacture and efficiency of operation.

In one form of collector, more particularly describable as a trolley because of the fact that it is particularly designed so as to ride along and in the duct, there is provided on the portion that rides in the duct, a set of riding wheels which support the collector and which facilitate movement of the collector along the duct, and a second set of collector wheels which engage the bus bars in the duct to act in the nature of roller contacts.

In this form of collector, or trolley, there is secured to the portion riding in the duct, a second portion, outside of the duct, the second portion, outside of the duct, containing fused switches such as are disclosed in a co-pending application, Serial No. 480,463, filed: September 8, 1930 by H. J. L. Frank, one of the applicants of this case. The switches connect the collector wheels to the load, by flexible cables leading downwardly from the trolley.

In this form of collector or trolley, the portion that is outside of the duct is provided with a suitable means for suspending a power tool or the like, the means also facilitating movement of the trolley along the duct.

Objects of the invention which relate more distinctly to novel and important details of manufacture of the collector devices shown and described herein, will be readily apparent upon reference to the following detailed description of a device embodying the invention, which device is shown in the appended drawing.

Referring to this drawing it will be seen that—

Figs. 1 to 3 show a trolley of the invention in plan, cutaway elevation, and end view, respectively;

Fig. 4 shows a male member of one of the fused switching means forming part of the trolley of Figs. 1 to 3.

The collector of Figs. 1 to 4

In Figs. 1 to 4 there is shown a collector or trolley having a duct-contained portion referenced generally "A", and a supported portion, referenced generally "B", outside of the duct and connected to the duct-contained portion "A" by a pivotal connection, the same being specifically described hereafter.

The duct-contained portion "A" includes a U-shaped metal frame plate 10 to whose bight is secured a horizontally disposed, rigid base plate of insulation 11, preferably of laminated construction. The riding wheels of the trolley are secured to the frame plate 10 whereas the collector wheels are secured to the insulation sheet 11, which thus forms a barrier between the live collector wheels and the grounded riding wheels.

Disposed between the sides of the frame plate 10 and rigidly connected thereto and projecting beyond the ends thereof are heavy metal bars 12, whose ends project beyond the ends of the trolley, to form bumpers and absorb the shocks incident to the bumping of one trolley by another.

Passing through the sides of the frame plate and through the bumper bars 12 and fixedly mounted in a suitable manner not here described specifically are axles 14 on whose ends are frictionless bearings which journal the riding wheels 15, there being an axle 14 and consequently a pair of wheels 15 at each end of the frame plate. These wheels are adapted to ride upon the rail portions 16 of the duct shown in dotted lines in Fig. 3 and these wheels support the entire device, as well as all parts depending therefrom, such as power tools, etc., if the same are so provided.

For preventing lateral shifting of the trolley as it rides in the duct on the wheels 15, there are secured to the sides of the frame plate 10, between the riding wheels 15, side bearing wheels 55

18, the four of these provided being shown as journalled in vertical axles 20 supported in the end portions of the plates of stampings 21 in turn fixedly mounted on the sides of the frame plate 10.

Disposed on the rigid insulating base plate 11 are the collector wheels, and in the form shown, where the trolley is disclosed in connection with a duct having three bus bars, two on the vertical sides and one on the horizontal side of the duct, two of the collector wheels, referenced 24—25 will be journalled on resiliently mounted vertical axles 26, whereas one of collector wheels referenced 27 will be journalled on a resiliently mounted horizontal axle 28. The collector wheels per se, are of the construction disclosed in the Frank patent, No. 1,819,886, particularly in Fig. 2, and will therefore not be specifically described here.

The two vertically trunnioned wheels 24—25 are mounted in a suitable manner on fibre blocks 30 and are covered by sheets of insulation 31 secured to these blocks. Each sheet and its block shields the adjacent collector wheel and its associated parts, from the top of the duct, and from the opposite polarity bus bar.

Connected to the three binding posts 33, which are on the mountings of the three collector wheels 24, 25, and 27, are flexible conductors 34 which pass through holes in the insulating base plate 11 and through cutouts in the bight of the U-shaped frame plate 10 and between the sides of the frame plate 10, down to the portion B. The latter portion is connected to the portion A by means of swivel connections in the form of rivets 36 connecting lugs 37, riveted to the portion A, with lugs 38 riveted to the portion B, the portions "A" and "B" thus being rendered movable with respect to each other about the alined pivots 36 as an axis.

The portion "B", which is outside of the duct as shown, includes a large U-shaped sheet metal plate having a bight 40 and sides 41 between and to which sides are mounted the fused switches which connect conductors 34 to the load cables 43. Each of these switches includes a receptacle 44 and a fused plug 45 for co-operation therewith. The receptacles are secured by screws, such as the screw 46 shown, to a stamping 47 disposed inside of and riveted to the sides 41 of the U-shaped frame plate, three receptacles being shown for the three phases corresponding to the three bus bars in the duct, the three collector wheels, the three conductors 34, and the three load cables 43.

The stamping 47 is terminally bent to cooperate with a similarly bent part 48 and form therewith a clamp 48a through which passes and to which is clamped the cables 43.

For securely latching the fused plugs 45 in the receptacles when they are to be so disposed, each of the fused plugs is provided with a flexible strap 49 secured thereto, (Fig. 4) as by a screw bolt having a nut 50. The ends of the strap are bent and retroverted as at 51 and are provided with cutout tongues 52 for cooperative engagement with the holes 53 in the sides 41 of the U-shaped frame plate.

It is observed that the hooked ends 51 of the straps 49 provide convenient hangers for the plugs when the plugs are not to be inserted in their receptacles, as for example when the circuits through the plugs are to be broken to permit repair or fuse renewal. The straps permit the plugs to be hung on the duct structure at some convenient point, or upon a convenient part of the trolley.

To provide means for moving the trolleys to and fro in the duct, and for supporting a power tool or the like, auxiliary plates 56, secured to the side plates 41 as by screws 57, are provided. These plates project downwardly below the U-shaped frame plate 40—41 a considerable distance and at their lower ends are connected by a bolt 58 passed through the eye 59 of a rod 60. This rod provides means for moving the trolley, and for suspending a tool, etc.

We claim:

1. For riding within a trolley duct having a top, sides, and a slotted bottom, and a bus bar under and adjacent the top wall, a trolley having a head comprising a horizontal base dividing the duct horizontally into isolated cells, a horizontally axled bus bar engaging roller contact on top of said base, said trolley having horizontally axled rollers riding on said bottom wall and vertically axled rollers riding against the duct sides, and a spring for urging said roller contact towards the bus bar and away from the bottom wall.

2. In a multiphase current collector, a horizontal base plate, current collectors thereon and thereabove and projecting in opposite directions with respect to each other, and a current collector therebetween and on and above said plate and projecting vertically.

3. In a multiphase current collector, a horizontal base plate, blocks thereon and thereabove at diagonally opposed corners thereof, and oppositely directed collectors projecting horizontally from said blocks.

4. In a multiphase current collector, a horizontal base plate, blocks thereon and thereabove at diagonally opposed corners thereof, and oppositely directed collectors projecting horizontally from said blocks, means secured to and disposed under said base plate, and having vertical sides, horizontally axled rollers and vertically axled rollers on said sides.

5. For use with a duct having an elongated continuous slot in its bottom wall, a current collector having a portion riding therein and provided with current collector contacts and a portion projecting therefrom through said slot, and a tool supporting portion outside of said duct and pivotally connected to the riding portion on an axis parallel to the run of the duct, said outside portion including a member having circuit protecting switch means adjacent the duct and in circuit with the contacts and the supported tool.

6. In combination with a distributor duct containing bus bars and an elongated slot, a trolley type current collector comprising an elongated current collector carriage for rolling along the duct and collecting current from said bus bars and having longitudinally spaced sets of side thrust rollers, supporting rollers, and vertical thrust rollers for frictionlessly restraining though not absolutely preventing shifting and rocking movements of the carriage transversely of the longitudinal axis of the duct as it rolls along the duct, certain of the rollers being resiliently mounted to make contact with duct portions even though the carriage shift or rock slightly as it rolls along the duct, the carriage having a portion projecting through and riding in the slot and manipulable outside the duct and transversely remote from the longitudinal axis thereof for causing the collector to roll easily along the duct with the carriage therewithin.

7. In combination with a distributor duct containing bus bars and an elongated slot, a trolley type current collector comprising an elongated current collector carriage for rolling along the duct and collecting current from said bus bars and having longitudinally spaced sets of side thrust rollers, supporting rollers, and vertical thrust rollers for frictionlessly restraining though not absolutely preventing shifting and rocking movements of the carriage transversely of the longitudinal axis of the duct as it rolls along the duct, certain of the rollers being resiliently mounted to make contact with duct portions even though the carriage shift or rock slightly as it rolls along the duct, the carriage having a portion projecting through and riding in the slot and manipulable outside the duct and transversely remote from the longitudinal axis thereof for causing the collector to roll easily along the duct with the carriage therewithin, the portion carrying circuit protective means.

8. In combination with a distributor duct containing bus bars and an elongated slot, a trolley type current collector comprising an elongated current collector carriage for rolling along the duct and collecting current from said bus bars and having longitudinally spaced sets of side thrust rollers, supporting rollers, and vertical thrust rollers for frictionlessly restraining though not absolutely preventing shifting and rocking movements of the carriage transversely of the longitudinal axis of the duct as it rolls along the duct, certain of the rollers being resiliently mounted to make contact with duct portions even though the carriage shift or rock slightly as it rolls along the duct, the carriage having a portion projecting through and riding in the slot and manipulable outside the duct and transversely remote from the longitudinal axis thereof for causing the collector to roll easily along the duct with the carriage therewithin, the portion carrying circuit protective means in the nature of fusing and switching means.

9. In combination with a distributor duct containing bus bars and an elongated slot, a trolley type current collector comprising an elongated current collector carriage for rolling along the duct and collecting current from said bus bars and having longitudinally spaced sets of side thrust rollers, supporting rollers, and vertical thrust rollers for frictionlessly restraining though not absolutely preventing shifting and rocking movements of the carriage transversely of the longitudinal axis of the duct as it rolls along the duct, certain of the rollers being resiliently mounted to make contact with duct portions even though the carriage shift or rock slightly as it rolls along the duct, the carriage having a portion projecting through and riding in the slot and manipulable outside the duct and transversely remote from the longitudinal axis thereof for causing the collector to roll easily along the duct with the carriage therewithin, certain of the side thrust rollers being within the duct and acting as current collectors, rolling on bus bars on the sides of the duct.

10. In combination with a distributor duct containing bus bars and an elongated slot, a trolley type current collector comprising an elongated current collector carriage for rolling along the duct and collecting current from said bus bars and having longitudinally spaced sets of side thrust rollers, supporting rollers, and vertical thrust rollers for frictionlessly restraining though not absolutely preventing shifting and rocking movements of the carriage transversely of the longitudinal axis of the duct as it rolls along the duct, certain of the rollers being resiliently mounted to make contact with duct portions even though the carriage shift or rock slightly as it rolls along the duct, the carriage having a portion projecting through and riding in the slot and manipulable outside the duct and transversely remote from the longitudinal axis thereof for causing the collector to roll easily along the duct with the carriage therewithin, certain of the side thrust rollers being within the duct and acting as current collectors, rolling on bus bars on the sides of the duct, certain of the vertical thrust rollers also being within the duct and acting as current collectors, rolling on bus bars on horizontal surfaces of the duct.

11. In combination with a distributor duct containing bus bars and an elongated slot, a trolley type current collector comprising an elongated current collector carriage for rolling along the duct and collecting current from said bus bars and having longitudinally spaced sets of side thrust rollers, supporting rollers, and vertical thrust rollers for frictionlessly restraining though not absolutely preventing shifting and rocking movements of the carriage transversely of the longitudinal axis of the duct as it rolls along the duct, certain of the rollers being resiliently mounted to make contact with duct portions even though the carriage shift or rock slightly as it rolls along the duct, the carriage having a portion projecting through and riding in the slot and manipulable outside the duct and transversely remote from the longitudinal axis thereof for causing the collector to roll easily along the duct with the carriage therewithin, and a hinge connection between the carriage and the last mentioned portion whereby the collector is articulated.

12. In combination with a distributor duct containing bus bars and an elongated slot, a trolley type current collector comprising an elongated current collector carriage for rolling along the duct and collecting current from said bus bars and having longitudinally spaced sets of side thrust rollers, supporting rollers, and vertical thrust rollers for frictionlessly restraining though not absolutely preventing shifting and rocking movements of the carriage transversely of the longitudinal axis of the duct as it rolls along the duct, certain of the rollers being resiliently mounted to make contact with duct portions even though the carriage shift or rock slightly as it rolls along the duct, the carriage having a portion projecting through and riding in the slot and manipulable outside the duct and transversely remote from the longitudinal axis thereof for causing the collector to roll easily along the duct with the carriage therewithin, and a hinge connection between the carriage and the last mentioned portion whereby the collector is articulated, the axis of the hinge being parallel to the axis of the duct.

13. A combination of the character described in claim 6 wherein the portion manipulable outside the duct for causing the collector to roll along the duct is provided with a tool supporting means and a clamping means for a branch circuit conductor electrically connected to the contacts of the collector and freely depending from the collector, whereby the portion may be pulled along the duct by the tool supported thereby or by the conductor depending therefrom.

14. A combination of the character described in claim 6 wherein the portion manipulable outside the duct for causing the collector to roll along the duct is provided with a tool supporting means and a clamping means for a branch circuit conductor electrically connected to the contacts of the collector through circuit protective means forming part of the portion and freely depending from the collector, whereby the portion may be pulled along the duct by the tool supported thereby or by the conductor depending therefrom, the portion being connected thereto by a hinge connection whose axis is parallel to the axis of the duct.

15. A combination of the character described in claim 12 wherein the hinge connections are adjacent the duct slot, whereby practically all of the collector outside the duct can move with respect to the carriage within the duct.

HARRISON J. L. FRANK.
WILLIAM A. HARPER.